(12) United States Patent
Shamsunder

(10) Patent No.: US 6,760,321 B2
(45) Date of Patent: Jul. 6, 2004

(54) METHOD AND APPARATUS FOR BLOCK-BASED CHIP TIMING ESTIMATION IN A CODE DIVISION MULTIPLE ACCESS COMMUNICATION SYSTEM

(75) Inventor: Sanyogita Shamsunder, Basking Ridge, NJ (US)

(73) Assignee: Sandbridge Technologies, Inc., White Plains, NY (US)

( * ) Notice: Subject to any disclaimer, the term of this patent is extended or adjusted under 35 U.S.C. 154(b) by 0 days.

(21) Appl. No.: 10/274,597

(22) Filed: Oct. 21, 2002

(65) Prior Publication Data

US 2004/0085918 A1 May 6, 2004

(51) Int. Cl.[7] .............................................. H04B 7/216
(52) U.S. Cl. ........................ 370/342; 370/320; 375/137; 375/143; 375/152
(58) Field of Search ................................ 370/320, 335, 370/342, 441, 465, 515, 516, 517, 518, 519; 375/134, 137, 142, 143, 145, 149, 150, 152, 316, 326, 343, 148, 144, 346, 141, 200, 356

(56) References Cited

U.S. PATENT DOCUMENTS 5,509,035 A * 4/1996 Teidemann et al. ......... 375/356
5,764,686 A * 6/1998 Sanderford et al. ......... 375/149
6,137,773 A * 10/2000 Stilwell et al. .............. 370/209
6,580,750 B2 * 6/2003 Aue ........................... 375/150
6,647,055 B2 * 11/2003 Kuo ........................... 375/148
2001/0004377 A1 * 6/2001 Lee et al. .................... 375/141

OTHER PUBLICATIONS

J.G. Proakis, "Digital Communications," 3rd Edition, McGraw–Hill, pp. 358–364 and 744–752, 1995.
R. De Gaudenzi et al., "A Digital Chip Timing Recovery Loop for Band–Limited Direct–Sequence Spread–Spectrum Signals," IEEE Trans. On Communications, vol. 41, No. 11, pp. 1760–1769, Nov. 1993.

* cited by examiner

*Primary Examiner*—Phirin Sam
(74) *Attorney, Agent, or Firm*—Ryan, Mason & Lewis, LLP

(57) ABSTRACT

A code division multiple access communication system receiver includes block-based chip timing estimation. A chip timing estimate is generated from samples of a received signal by performing an averaging operation over a designated block of chips in each of first and second legs of an early-late synchronizer. The chip timing estimate is determined as a function of an error signal corresponding to the difference between outputs of the first and second legs, and is utilized to adjust a code generator clock or to otherwise control chip timing in the receiver. In an illustrative embodiment, a separate block-based chip timing estimator is implemented in each of the fingers of a Rake receiver.

20 Claims, 4 Drawing Sheets

METHOD AND APPARATUS FOR BLOCK-BASED CHIP TIMING ESTIMATION IN A CODE DIVISION MULTIPLE ACCESS COMMUNICATION SYSTEM

FIELD OF THE INVENTION

The present invention relates generally to the field of code division multiple access (CDMA) communication systems, and more particularly to chip timing estimation techniques for use in such systems.

BACKGROUND OF THE INVENTION

The term "chip" in a CDMA system refers generally to a code symbol, that is, a symbol that has been subject to the application of one or more pseudorandom spreading codes. The spreading factor M in a given system is given by $T/T_c$, where T denotes the original symbol duration and $T_c$ denotes the chip duration. The chip duration is also commonly referred to as the chip interval.

A given chip timing estimation technique generally includes an initial signal acquisition phase followed by a signal tracking phase. The initial acquisition phase typically relies on coarse estimation of the chip timing, with fine estimation being provided by the tracking phase.

Accurate chip timing is particularly critical to the successful operation of recently-developed high-speed CDMA systems such as the 3rd Generation Partnership Project (3GPP) Wideband CDMA (WCDMA) system, described in 3GPP Technical Specifications TS 25.1xx (including, e.g., 25.101, 25.211, 25.212, 25.213, etc.), which are incorporated by reference herein.

In a CDMA system, inaccurate chip timing results in performance loss because code orthogonality lowers the energy of misaligned signals. In addition, when multipath effects are present in such a system, the different path delays need to be determined accurately in order to align and constructively combine the received signal energies in the multiple paths, e.g., using a conventional Rake receiver. More particularly, for each of the path arrival times, chip timing at the transmitter and receiver needs to be well aligned so as to permit correct reconstruction of the data. If the timing mismatch is sufficiently large, the orthogonality of the codes can cause the received signal to appear as noise.

A number of well-known conventional timing estimation techniques are described in J. G. Proakis, "Digital Communications," 3rd Edition, McGraw-Hill, 1995, (e.g., pp. 358–364 and 744–752), which is incorporated by reference herein. These include techniques based on an early-late synchronizer, and techniques based on a delay-locked loop (DLL).

Another conventional technique is described in R. De Gaudenzi, M. Luise and R. Viola, "A Digital Chip Timing Recovery Loop for Band-Limited Direct-Sequence Spread-Spectrum Signals," IEEE Trans. On Communications, Vol. 41, No. 11, pp. 1760–1769, Nov. 1993, which is incorporated by reference herein.

As indicated previously, the goal of the timing estimation techniques noted above is to maintain alignment between transmitter and receiver chip timing. Typically, it is desirable to maintain the timing alignment within about ⅛ of the chip duration $T_c$ for negligible impact on system performance.

Unfortunately, the known chip timing estimation techniques described above may have difficulty maintaining the desired timing alignment in certain systems, or may exhibit other drawbacks such as undue circuit complexity. This is particularly true in the case of high-speed CDMA systems such as the 3GPP WCDMA system. A need therefore exists for improved chip timing estimation techniques for use in such systems.

SUMMARY OF THE INVENTION

The present invention provides methods and apparatus for block-based chip timing estimation in a receiver of a CDMA system.

In accordance with one aspect of the invention, a chip timing estimate is generated in the receiver from samples of a received signal by performing an averaging operation over a designated block of chips in each of first and second legs of an early-late synchronizer. The chip timing estimate is determined as a function of an error signal corresponding to the difference between outputs of the first and second legs, and is utilized to adjust a code generator clock or to otherwise control chip timing in the receiver. The chip timing estimate may comprise a further refinement of a coarse chip timing estimate generated for the receiver within an accuracy of a single chip duration.

For example, the chip timing estimate may comprise an estimate of chip timing error normalized to the chip duration $T_c$.

In an illustrative embodiment, a separate block-based chip timing estimator is implemented in each of the fingers of a Rake receiver. More particularly, chip timing estimates are generated and utilized independently in each of the Rake fingers.

The chip timing estimate may be generated from samples of the received signal by performing a given averaging operation over a specified number $N_c$ of chips in the first leg of the early-late synchronizer and performing the same averaging operation over the same specified number $N_c$ of chips in the second leg. The specified number $N_c$ of chips may be on the order of, e.g., approximately 32 to 64 chips, and may be substantially less than a number of chips $N_b$ which defines an estimation interval for which the chip timing estimate is generated. For example, $N_b$ may be given approximately by the number of chips per slot in a given frame of data, or 2,560 chips in the 3GPP WCDMA system noted above. Other values of N, can be used, e.g., it may be desirable to use more than 64 chips in particularly noisy conditions.

The invention in the illustrative embodiment is configured such that the chip timing estimate is determined in an open-loop, feed-forward manner. The invention thus provides an improved chip timing estimator which eliminates the need for a hardware-based timing loop, and can therefore be implemented primarily in the form of software. This arrangement advantageously provides improved performance in the 3GPP WCDMA system and other high-speed CDMA systems, while also reducing the cost and complexity of the receiver circuitry.

DETAILED DESCRIPTION OF THE INVENTION

The present invention will be illustrated herein as implemented in an example Rake receiver of a CDMA communication system. It should be understood, however, that the invention does not require the use of any particular communication standard or receiver configuration associated with the illustrative embodiment, and is more generally suitable for use in any CDMA receiver which can benefit from improved chip timing estimation.

Figure 1:
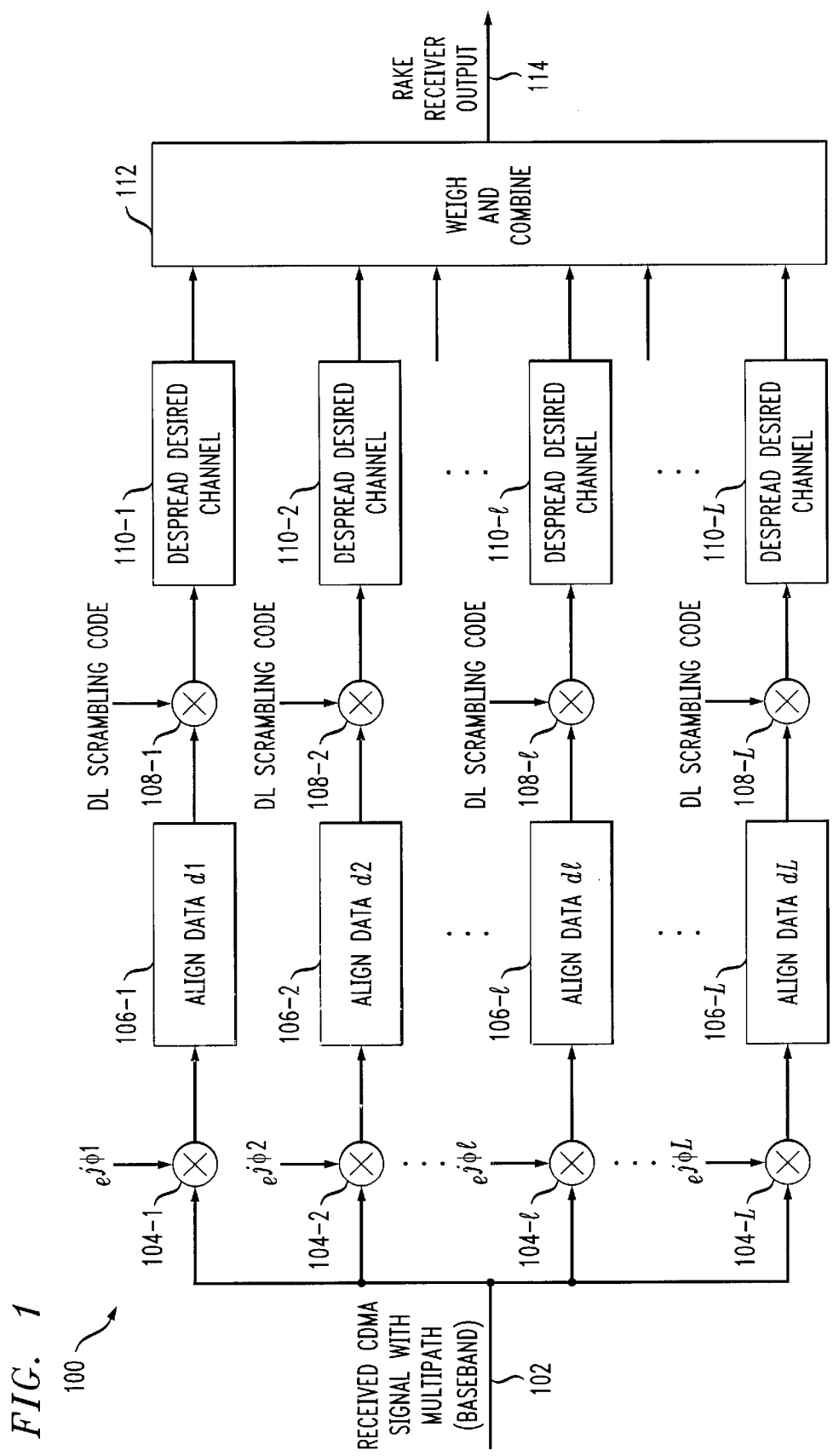
FIG. 1 shows a Rake receiver in which the present invention may be implemented.

FIG. 1 shows a Rake receiver 100 in which the present invention may be implemented. The Rake receiver 100 may be incorporated, by way of example, into a mobile unit of a CDMA cellular communication system in order to counteract multipath effects associated with the base-to-mobile downlink.

The Rake receiver 100 processes a received CDMA signal 102 in L distinct paths, each of the paths including a multiplier 104-i, alignment circuitry 106-i, a multiplier 108-i, and a despreader 110-i, where i=1, 2, ... 1, ... L. Each of the L paths is also referred to as a "finger" of the Rake receiver 100. The signal 102 corresponds generally to a baseband CDMA signal, and may comprise input samples received from an analog-to-digital converter (ADC) associated with other baseband processing circuitry of the receiver. Receiver circuitry suitable for converting a given radio frequency (RF) received CDMA signal to baseband is well-known in the art and therefore not described in detail herein.

The first multiplier 104-i in each of the L paths of the receiver 100 multiplies the baseband received CDMA signal 102 by a corresponding conversion signal denoted $e^{j\Phi i}$ in order to remove any random phase changes due to fading or other channel variations. The alignment circuitry 106-i aligns the resulting baseband data to a particular path delay $d_i$. The second multiplier 108-i then applies an appropriate downlink (DL) scrambling code to descramble the aligned data, and the resulting descrambled data is then despread in despreader 110-i. A processing element 112 weighs and combines the despread signals from each path to generate an output signal 114.

In general, it is possible to separate multipath components of the received CDMA signal in the manner illustrated in FIG. 1 as long as the paths are separated from one another by at least the chip duration $T_c$.

Additional details regarding conventional aspects of Rake receivers such as that shown in FIG. 1 can be found in the above-cited J. G. Proakis reference.

The receiver 100 of FIG. 1 may be a mobile unit receiver in a 3GPP WCDMA system of the type described in the 3GPP documents previously referred to herein. The base-to-mobile downlink in the 3GPP WCDMA system utilizes Quadrature Phase Shift Keying (QPSK) signaling with root-raised cosine pulse-shaping having a roll-off of 0.22. The downlink typically includes time-multiplexed control and data on a dedicated channel, broadcast channels and other shared channels, as well as a common pilot channel with a known pattern such as all logic "one" values. The downlink channels are spread using Orthogonal Variable Spreading Factor (OVSF) spreading codes and the resulting spread signal is scrambled with a base station specific complex scrambling code. The spreading codes are also commonly referred to as channelization codes. The base station specific complex scrambling code is a Gold code. The spreading or channelization codes have variable lengths or spreading factors M from 4 to 512, while the scrambling code length is 38,400 chips and repeats every frame. A frame of transmitted data is 10 milliseconds long and comprises 15 slots, each with 2,560 chips. The chip duration or interval is thus $T_c$=260 nanoseconds, and the chip rate is 38.4 Mchips per second.

The 3GPP WCDMA specifications further provide that a chip timing clock and a carrier frequency clock are derived from a single crystal whose frequency is tracked using an automatic frequency control system.

In an implementation of the FIG. 1 receiver with conventional chip timing estimation, each of the Rake fingers typically includes its own code generator, with the timing of the code generator being controlled by a hardware-based timing loop. The hardware-based timing loop in such an implementation typically adjusts or otherwise controls a code generator clock, the timing of an interpolator, or other timing circuitry, in order to ensure that sample values are generated at the correct sampling instances.

Figure 2:
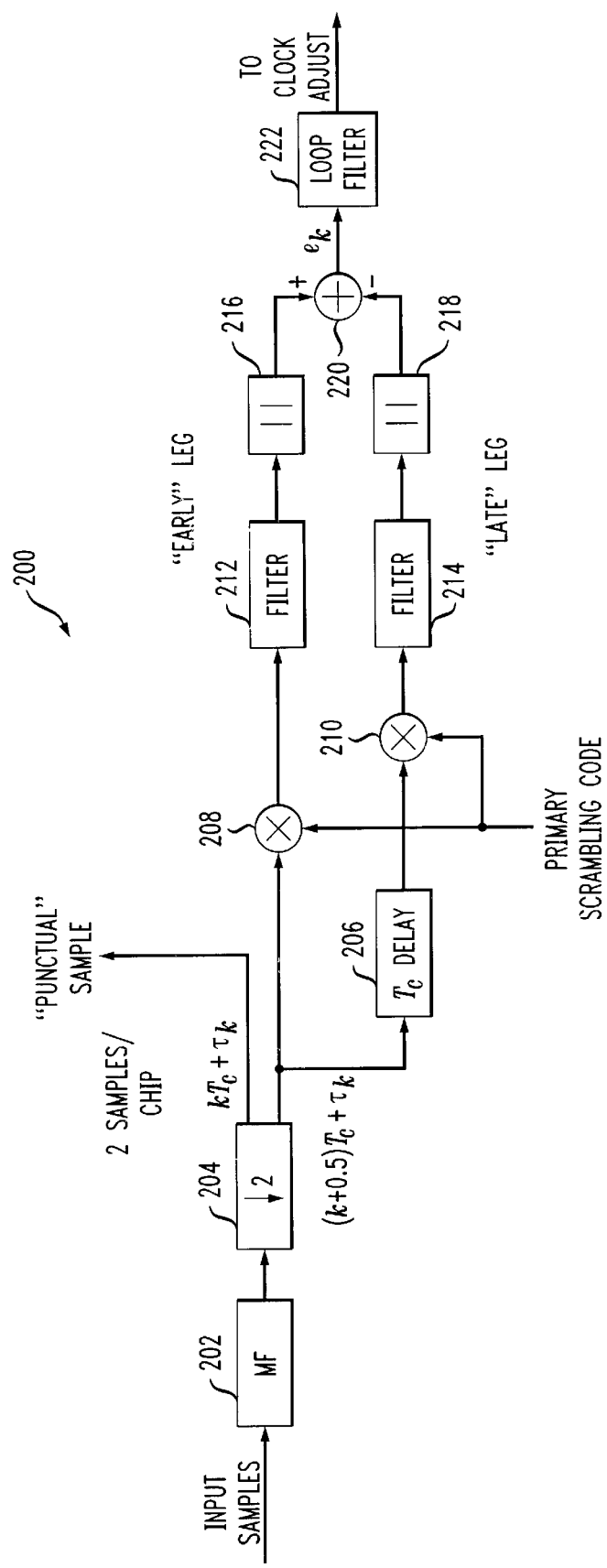
FIG. 2 illustrates a chip timing estimator suitable for use in a hardware-based timing loop in the FIG. 1 receiver.

FIG. 2 shows a chip timing estimator 200 of a type suitable for use in conjunction with the hardware-based timing loop referred to above. More particularly, the chip timing estimator 200 is based on the early-late synchronizer approach, and is configured for use in a hardware-based timing loop which is in the form of a delay-locked loop (DLL). As indicated previously, conventional aspects of timing estimation techniques of this type are described in greater detail in the above-cited J. G. Proakis reference.

The chip timing estimator 200 processes input samples, typically received from a baseband ADC in the corresponding receiver. The samples are applied to a matched filter (MF) 202, and the filtered samples are downsampled by a factor of two in a downsampler 204 which produces two samples per chip, namely a first or so-called "punctual" sample denoted herein as $kT_c+\tau_k$, and a second sample denoted herein as $(k+0.5)T_c+\tau_k$. The quantity $\tau_k$ denotes the clock phase error between transmitter and receiver. The punctual sample may be supplied to despreaders, carrier tracking circuitry, channel estimation circuitry, etc. in a conventional manner. The second sample is supplied to a first multiplier 208 and via a $T_c$ delay element 206 to a second multiplier 210.

As noted previously, a given chip timing estimation technique generally includes an initial signal acquisition phase followed by a signal tracking phase. The initial acquisition phase typically relies on coarse estimation of the chip timing, with fine estimation being provided by the tracking phase. The chip timing estimator 200 is configured to provide fine estimation and tracking of $\tau_k$, as part of a signal tracking phase, given an initial coarse estimate of $\tau_k$ determined as part of the acquisition phase.

Referring again to FIG. 2, the second sample and its delayed version are multiplied by the primary base station specific scrambling code of the current cell, in the respective multipliers 208 and 210. The resulting outputs are filtered in respective single-pole, single-tap filters 212 and 214, passed through respective absolute value elements 216 and 218, and then subtracted in a signal combiner 220 as shown. Elements 208, 212 and 216 may be viewed as comprising an "early" leg of an early-late synchronizer, while elements 210, 214 and 218 comprise a "late" leg of the early-late synchronizer. The output of the signal combiner is an error signal $e_k$ that is applied to a loop filter 222 associated with the above-noted hardware-based timing loop, and therein utilized to provide clock adjustment or other timing control functions in a conventional manner. The error signal $e_k$ is proportional to the clock phase error $\tau_k$ between transmitter and receiver.

Figure 3:
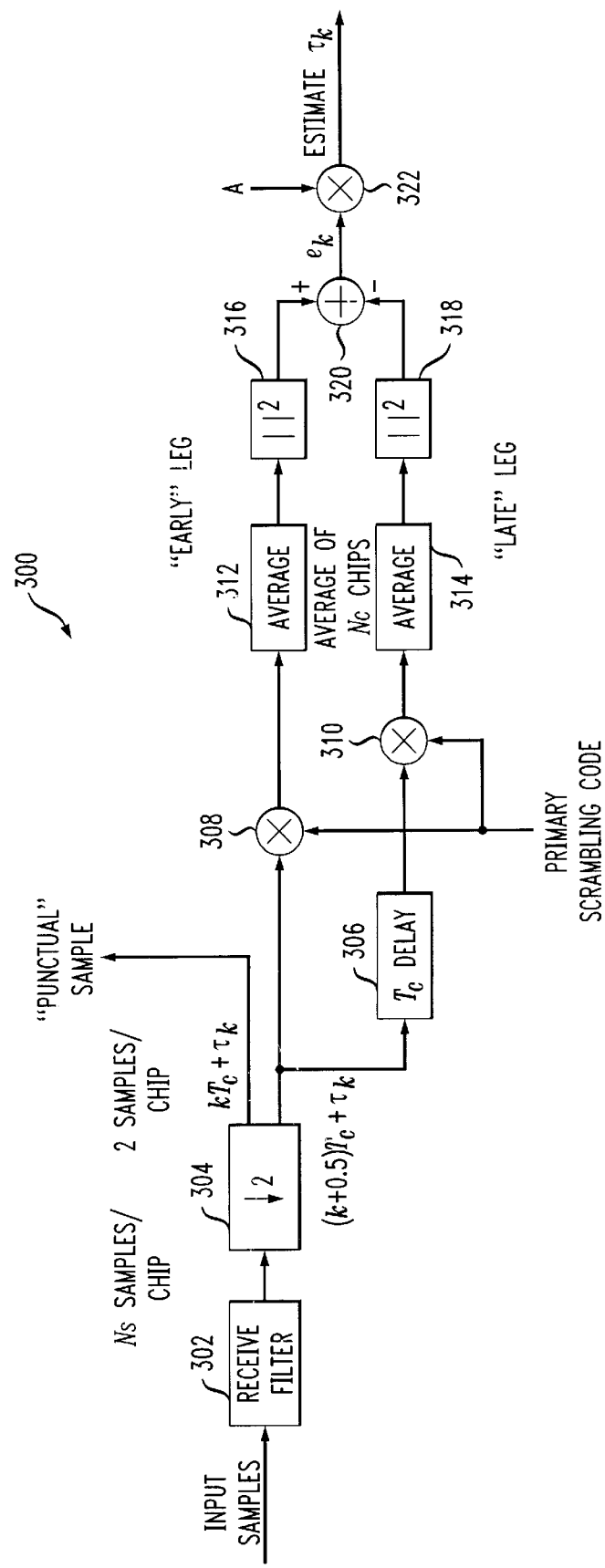
FIG. 3 shows a block-based chip timing estimator in accordance with an illustrative embodiment of the present invention.

The present invention in accordance with one aspect thereof provides an improved block-based chip timing estimator which overcomes a number of disadvantages associated with the chip timing estimator of FIG. 2. More particularly, the invention in the illustrative embodiment to be described below in conjunction with FIG. 3 provides an improved chip timing estimator which eliminates the need for-the above-described hardware-based timing loop, and can therefore be implemented primarily in the form of software. This arrangement advantageously provides improved performance in the 3GPP WCDMA system and other high-speed CDMA systems, while also reducing the cost and complexity of the receiver circuitry.

FIG. 3 shows a chip timing estimator 300 in accordance with the illustrative embodiment of the invention. The chip timing estimator 300 is configured to provide an estimate of the clock phase error $\tau_k$ between transmitter and receiver in a CDMA system such as the previously-described 3GPP WCDMA system. Like the chip timing estimator 200 of FIG. 2, the chip timing estimator 300 may be viewed as providing fine estimation and tracking of $\tau_k$, as part of a signal tracking phase, given an initial coarse estimate of $\tau_k$ determined as part of an initial signal acquisition phase. The initial coarse estimate may be determined using any of a variety of well-known conventional techniques, as will be readily apparent to those skilled in the art.

It is assumed without limitation for purposes of the illustrative embodiment of FIG. 3 that the initial coarse estimate provides the chip timing for each of the L paths of the Rake receiver 100 within an accuracy of one chip duration $T_c$. In other words, it is assumed that the coarse estimate yields the time of arrival of each path, also referred to as the path delay, within $|\tau|<0.5T_c$. The chip timing estimator 200 then further refines the estimate of $\tau_k$ using an exemplary implementation of a block-based approach of the present invention which involves averaging over a block of $N_c$ chips. These further refinements are performed in an open-loop, feed-forward manner, thereby avoiding the need for a hardware-based timing loop. After initial signal acquisition, the coarse estimate may be recomputed approximately once or twice a frame as required in order to track the path delay if it has moved beyond the desired accuracy of one chip duration $T_c$.

With reference now to FIG. 3, the improved chip timing estimator 300 processes input samples, e.g., input samples received from an ADC in the corresponding receiver. The estimate is performed over a designated number $N_s$ of samples per chip. It is also assumed without limitation that the timing error is essentially constant over this estimation interval. The scrambling code segment is preferably chosen so that the chips are aligned with those from an incoming received block of chips.

It is to be appreciated that the above assumptions and any other assumptions referred to herein are for purposes of illustration only, and should not be construed as limiting the scope of the invention in any way. The invention can be implemented in embodiments in which these particular assumptions do not apply.

The input samples are applied to a receive filter 302, and the filtered samples are downsampled by a factor of two in a downsampler 304 which produces at least two samples per chip, namely a first or "punctual" sample $kT_c+\tau_k$, and a second sample $(k+0.5)T_c+\tau_k$. As indicated previously, the quantity $\tau_k$ denotes the clock phase error between transmitter and receiver. The punctual sample may be supplied to despreaders, carrier tracking circuitry, channel estimation circuitry, etc. in a conventional manner. The second sample is supplied to a first multiplier 308 and via a $T_c$ delay element 306 to a second multiplier 310. The second sample and its delayed version are multiplied by the primary base station specific scrambling code of the current cell, in the respective multipliers 308 and 310.

In accordance with one aspect of the invention, the resulting outputs from multipliers 308 and 310 are averaged over $N_c$ chips in respective averaging elements 312 and 314, the absolute values of the averages are squared in respective squaring elements 316 and 318, and then the resulting signals are subtracted in a signal combiner 320 as shown. Elements 308, 312 and 316 may be viewed as comprising an "early" leg of an early-late synchronizer, while elements 310, 314 and 318 comprise a "late" leg of the early-late synchronizer. The output of the signal combiner 320 is an error signal $e_k$ that is proportional to the clock phase error $\tau_k$ between transmitter and receiver. The error signal $e_k$ is multiplied by a scale factor A in a multiplier 322 to generate the estimate of the clock phase error $\tau_k$ between transmitter and receiver. The scale factor A is a function of input signal gain and pulse shape, and may be determined in a straightforward manner well within the level of ordinary skill in the art. In other embodiments, the scale factor may be eliminated and alternative signal amplitude control circuitry of a type known in the art may be used.

One or both of the averaging elements 312 and 314 may be replaced with corresponding filter elements in an alternative embodiment of the invention. Filters may be more suitable, for example, in the presence of particular noise conditions.

With regard to the receive filter 302, the optimal receive filter for Gaussian noise scenarios is one that is exactly matched to the transmit pulse shape. As noted above, the 3GPP WCDMA system utilizes root-raised cosine pulse-shaping having a roll-off of 0.22. The ideal root-raised cosine filter is infinite in length. However, receive filter 302 may be configured as a windowed root-raised cosine filter. More specifically, receive filter 302 may, by way of example and without limitation, be configured as a windowed root-raised cosine filter with 19 taps, with the following set of 19 filter coefficients: [0.05023 0.02475 −0.03263−0.08963− 0.09990−0.02866 0.12330 0.31256 0.46931 0.53006 0.46931 0.31256 0.12330 −0.02866 −0.09990 −0.08963 −0.03263 0.02475 0.0502]. Of course, other filter arrangements can be used, and the invention is not restricted to any particular receive filter arrangement.

The estimator 300 is configured to provide an estimate of the timing error for every $N_c$ chips. The estimate may be expressed, by way of example and without limitation, as normalized phase error $\tau$, which corresponds generally to the clock phase error $\tau_k$ normalized to the chip duration $T_c$. The normalized phase error may provide the correction to be applied to the timing of the punctual sample. That is, the sampling instant of the punctual sample should be corrected by the amount of the error. Since the received data is being oversampled by a factor of four in the illustrative 3GPP WCDMA implementation, there are multiple sample values of the same chip available. These values are essentially the values of the chip pulse at integers of the sampling instant. The phase error does not necessarily fall on the time grid being used for the sampling. However, it may be approximated so that the closest sampling instant for which the sample is available can be used. For example, the estimate of the clock phase error $\tau_k$ may be rounded off so as to use the nearest known sample value. In a 3GPP WCDMA implementation, since there are four samples per chip, the maximum error due to round-off does not exceed $T_c/8$.

It should be noted that the received signal samples are typically held in a buffer or other memory element of the receiver. Thus, the process of generating the sample value at the corrected sampling instant may amount to using a different entry of the buffer. More particularly, the phase error estimate may be used to generate an address pointer that points to the sample value at the corrected sampling instance in an input data buffer or other memory element associated with the corresponding finger of the Rake receiver 100.

An alternative approach is to perform an interpolation operation, using the estimate of the clock phase error $\tau_k$, in order to obtain the exact sample value. More particularly, the estimated error may be used to generate a sample value by interpolating between known sample values. It should be noted that this alternative approach will generally result in an increase in computational complexity relative to the above-described rounding off approach.

The chip timing estimator 300 of FIG. 3 provides a number of significant advantages relative to the chip estimator 200 of FIG. 2. For example, the chip timing estimator 300 eliminates the filters 212 and 214 and instead exploits the fact that the system includes the above-noted common pilot channel with a known pattern such as all logic "one" values. The averaging over $N_c$ chips improves the signal to noise ratio (SNR) and yields reliable estimates of normalized phase error $\tau$. Since the hardware-based timing loop is eliminated, the loop filter 222 is eliminated as well, further reducing receiver cost and complexity.

As is apparent from the above description, the timing error in the FIG. 3 embodiment is obtained as an average of the early-late leg difference over a short observation block defined by the number of chips $N_c$. Although the number of chips and the particular averaging operation used are the same in each leg of the early-late synchronizer in the illustrative embodiment, this is not a requirement of the invention.

The block-based chip timing estimator 300 operates in an open-loop, feed-forward manner and can be configured to provide an accurate estimate of the timing error $\tau_k$, as a fraction of the chip duration $T_c$, every $N_b$ chips, where typically $N_b >> N_c$. A suitable block length $N_c$ for estimation in the above-described 3GPP WCDMA system may be on the order of approximately 32 to 64 chips. Because the paths are generally changing slowly and the clock drift is negligible, the estimation need not be performed very often. For example, the estimate in one possible implementation may be performed once every $N_b$=2,560 chips, i.e., once for each slot in the 3GPP WCDMA system, on a block on $N_c$=32 chips.

Of course, other values of $N_c$ can be used, and the particular number used may vary depending upon the application. As one possible example, it may be desirable to use more than 64 chips in particularly noisy conditions. The invention thus does not require the use of any particular value of $N_c$.

Because the different paths associated with the above-mentioned multipath effects change independently of one another, the chip timing for each path should be separately adjusted. Thus, there will generally be L distinct chip timing estimators for the L different fingers of the Rake receiver 100. The resulting chip timing estimates are used to obtain the correct data samples for processing in the Rake receiver 100.

Figure 4:
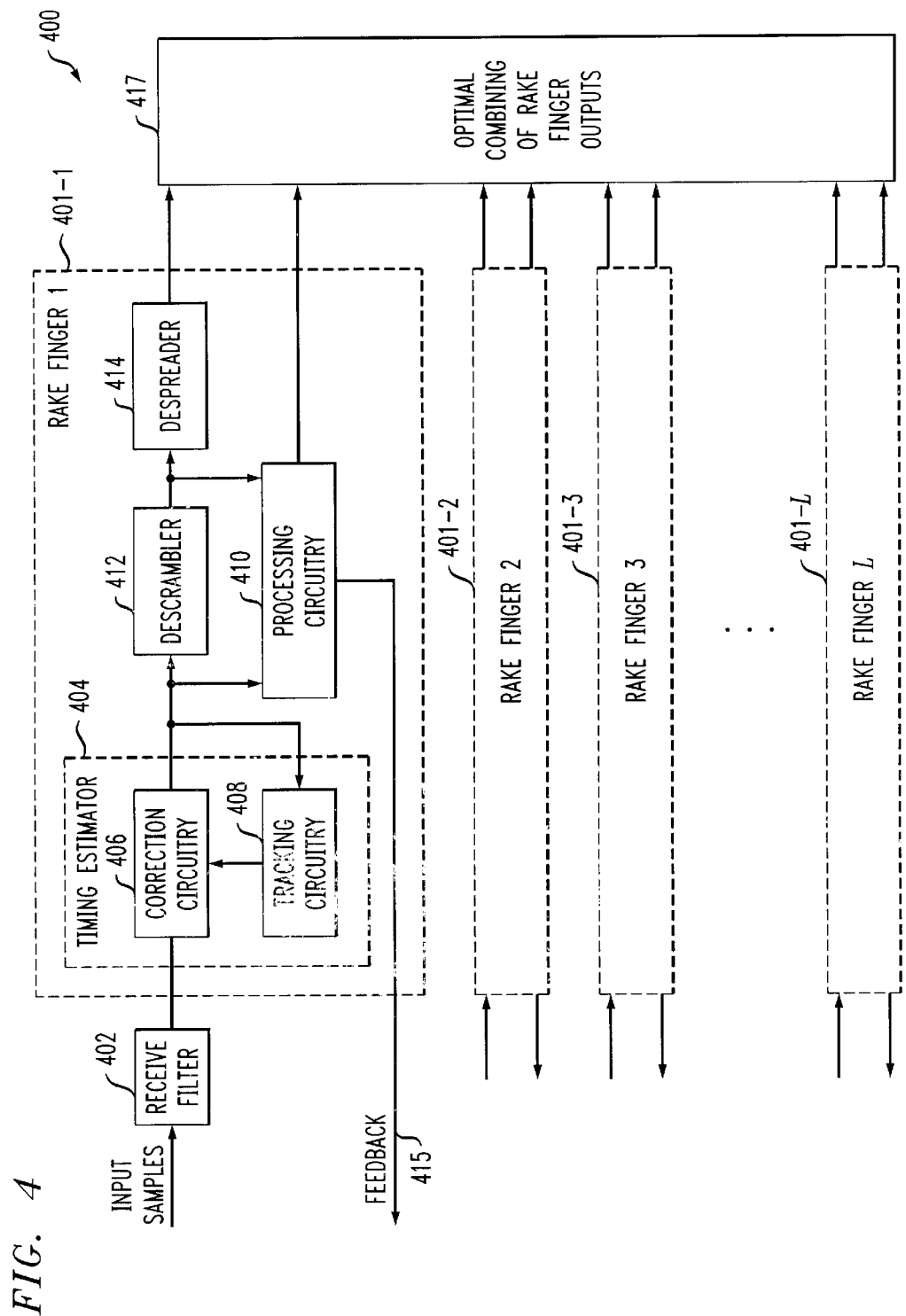
FIG. 4 illustrates the incorporation of the block-based chip timing estimator into a Rake receiver of the type shown in FIG. 1.

FIG. 4 illustrates the manner in which a timing estimator such as timing estimator 300 of FIG. 3 may be incorporated into a Rake receiver 400. The Rake receiver 400, only a portion of which is shown in the figure, is assumed to operate substantially in the manner described in conjunction with the receiver 100 of FIG. 1, and to include similar processing elements. The receiver 400 includes L Rake fingers denoted 401-1, 401-2, . . . 401-L. Input samples are applied to a given one of the fingers 401-1 via a receive filter 402 which provides root-raised cosine filtering in the case of the 3GPP WCDMA system. The given finger 401-1 includes a chip timing estimator 404 which may correspond generally to the chip timing estimator 300 of FIG. 3 and processes the input samples in the manner previously described. The chip timing estimator 404 is shown as including timing correction circuitry 406, which implements sample changes based on chip timing estimates generated by tracking circuitry 408 in the manner described above. The signal outputs from the correction circuitry 406 are applied to a descrambler 412 which corresponds generally to the multiplier 108-1 of FIG. 1, and the resulting descrambled outputs are applied to a despreader 414 which corresponds generally to the despreader 110-1 of FIG. 1. The despreader outputs of each of the fingers 401-1 are applied to an optimal combiner 417, which corresponds generally to the weigh and combine element 112 of FIG. 1.

Also associated with each of the L fingers 401 is additional processing circuitry 410 which is responsible for performing other processing operations typically performed in a CDMA digital receiver. Feedback 415 from the processing circuitry is supplied back to other portions of the Rake receiver 400 not explicitly shown in the figure. The additional processing circuitry 410 and feedback 415 may be configured in a well-known conventional manner, and are therefore not described in further detail herein. Each of Rake fingers 401 in FIG. 4 is configured in substantially the same manner as that illustrated for Rake finger 401-1. One or more of the timing estimation, descrambling and despreading elements of a given Rake finger may be incorporated in whole or in part in the processing circuitry 410 associated with that Rake finger.

Although the configuration of receiver 400 as shown in FIG. 4 assumes that at least a portion of processing circuitry 410 is repeated in each of the Rake fingers, this is by way of illustrative example only. In an alternative arrangement, the processing circuitry 410 may be centralized within the receiver 400, such that it is not incorporated within any particular finger.

The above-described embodiments of the invention are intended to be illustrative only, and numerous alternative embodiments within the scope of the appended claims will be apparent to those skilled in the art. For example, the invention can be implemented using other arrangements of chip timing estimation circuitry, and receiver configurations other than the example Rake receivers described herein. Also, the number of chips $N_c$ utilized for block-based chip timing estimation may be varied depending upon the particular needs of a given application.

What is claimed is:

1. A method for estimating chip timing in a receiver of a code division multiple access communication system, the method comprising the steps of:

generating a chip timing estimate from samples of a received signal by performing an averaging operation over a designated block of chips in each of first and second legs of an early-late synchronizer, the chip timing estimate being determined as a function of an error signal corresponding to the difference between outputs of the first and second legs; and utilizing the chip timing estimate to control chip timing in the receiver.

2. The method of claim 1 wherein the code division multiple access communication system comprises a third-generation partnership plan wideband code division multiple access communication system.

3. The method of claim 1 wherein the generating step comprises generating the chip timing estimate based on at least two samples per chip.

4. The method of claim 1 wherein the receiver comprises a Rake receiver having a plurality of Rake fingers, the generating and utilizing steps being implemented in a particular one of the fingers of the Rake receiver.

5. The method of claim 4 wherein the generating and utilizing steps are implemented independently in each of the plurality of Rake fingers.

6. The method of claim 1 wherein the chip timing estimate comprises a further refinement of a coarse chip timing estimate generated for the receiver within an accuracy of a single chip duration.

7. The method of claim 1 wherein the generating step further comprises generating the chip timing estimate from samples of the received signal by performing an averaging operation over a specified number $N_c$ of chips in the first leg and performing the same averaging operation over the same specified number $N_c$ of chips in the second leg.

8. The method of claim 7 wherein the specified number $N_c$ of chips is greater than or equal to approximately 32 chips.

9. The method of claim 7 wherein the specified number $N_c$ of chips is substantially less than a number of chips $N_b$ which defines an estimation interval for which the chip timing estimate is generated.

10. The method of claim 9 wherein $N_b$ is given approximately by the number of chips per slot in a given frame of data.

11. The method of claim 9 wherein $N_b$ is given approximately by 2,560.

12. The method of claim 7 wherein the chip timing estimate comprises an estimate of chip timing error normalized to chip duration.

13. The method of claim 1 wherein the generating step further comprises performing the averaging operation over a designated block of descrambled chips.

14. The method of claim 1 wherein the generating step determines the chip timing estimate in an open-loop, feedforward manner.

15. The method of claim 1 wherein the generating step further comprises generating the chip timing estimate by applying a scaling factor to the error signal.

16. The method of claim 1 wherein the utilizing step further comprises the step of rounding off the chip timing estimate to a closest available sample value, the rounded off estimate being utilizable to generate an address pointer that points to a sample value in a memory element of the receiver.

17. The method of claim 1 wherein the utilizing step further comprises the step of utilizing the chip timing estimate to generate a sample value by interpolating between a plurality of known sample values.

18. An apparatus for estimating chip timing in a receiver of a code division multiple access communication system, the apparatus comprising:

a chip timing estimator operative to generate a chip timing estimate from samples of a received signal by performing an averaging operation over a designated block of chips in each of first and second legs of an early-late synchronizer implemented within the chip timing estimator, the chip timing estimate being determined as a function of an error signal corresponding to the difference between outputs of the first and second legs;

wherein the chip timing estimate generated by the chip timing estimator is utilizable to control chip timing in the receiver.

19. A code division multiple access communication system receiver comprising a plurality of signal processing paths, at least one of the signal processing paths comprising a chip timing estimator operative to generate a chip timing estimate from samples of a received signal by performing an averaging operation over a designated block of chips in each of first and second legs of an early-late synchronizer implemented within the chip timing estimator, the chip timing estimate being determined as a function of an error signal corresponding to the difference between outputs of the first and second legs, wherein the chip timing estimate generated by the chip timing estimator is utilizable to control chip timing in the receiver.

20. An article of manufacture comprising a machine-readable memory element for storing at least a portion of one or more software programs for estimating chip timing in a receiver of a code division multiple access communication system, the one or more software programs when executed implementing the step of generating a chip timing estimate from samples of a received signal by performing an averaging operation over a designated block of chips in each of first and second legs of an early-late synchronizer, the chip timing estimate being determined as a function of an error signal corresponding to the difference between outputs of the first and second legs, the chip timing estimate being utilizable to control chip timing in the receiver.

* * * * *